US008849900B2

(12) United States Patent
Falchuk et al.

(10) Patent No.: US 8,849,900 B2
(45) Date of Patent: Sep. 30, 2014

(54) METHOD AND SYSTEM SUPPORTING MOBILE COALITIONS

(75) Inventors: Benjamin Falchuk, Upper Nyack, NY (US); David Famolari, Stewartsville, NJ (US)

(73) Assignees: Telcordia Technologies, Inc., Piscataway, NJ (US); Kabushiki Kaisha Toshiba, Tokyo (JP)

(*) Notice: Subject to any disclaimer, the term of this patent is extended or adjusted under 35 U.S.C. 154(b) by 335 days.

(21) Appl. No.: 13/040,296

(22) Filed: Mar. 4, 2011

(65) Prior Publication Data

US 2012/0226736 A1 Sep. 6, 2012

(51) Int. Cl.
| | |
|---|---|
| G06F 15/16 | (2006.01) |
| H04N 21/6332 | (2011.01) |
| G06F 3/14 | (2006.01) |
| H04N 21/414 | (2011.01) |
| H04N 21/485 | (2011.01) |
| H04N 21/81 | (2011.01) |
| G06F 9/50 | (2006.01) |
| H04N 21/41 | (2011.01) |
| H04L 29/06 | (2006.01) |
| H04L 29/08 | (2006.01) |
| G09G 5/12 | (2006.01) |

(52) U.S. Cl.
CPC .......... *G06F 9/5061* (2013.01); *H04N 21/6332* (2013.01); *G06F 3/1446* (2013.01); *H04N 21/41407* (2013.01); *H04L 67/1095* (2013.01); *H04N 21/4858* (2013.01); *H04N 21/816* (2013.01); *H04N 21/4122* (2013.01); *G09G 2370/022* (2013.01); *H04L 65/403* (2013.01); *G09G 5/12* (2013.01)
USPC ........... 709/203; 709/201; 709/202; 709/204; 709/205; 715/751; 715/778

(58) Field of Classification Search
USPC .......... 709/203, 201, 202, 204, 205; 715/751, 715/778
See application file for complete search history.

(56) References Cited

U.S. PATENT DOCUMENTS 6,453,336 B1 * 9/2002 Beyda et al. .................. 709/204
7,116,977 B1 10/2006 Molton et al.
(Continued)

FOREIGN PATENT DOCUMENTS

WO 02/058360 A2 7/2002
WO WO 02058360 A2 * 7/2002
(Continued)

OTHER PUBLICATIONS

International Application No. PCT/US2012/027377—PCT International Search Report dated May 20, 2012.
(Continued)

*Primary Examiner* — Liangche A Wang
*Assistant Examiner* — Cheikh Ndiaye

(57) ABSTRACT

A system and method for supporting mobile coalitions for entertainment comprises devices including a master device, a server having a multimedia service executable by the master device and modules operable to recommend formation of a coalition based on the service, invite the devices to participate in the coalition, set up the coalition by determining the devices to participate, launching on each device a link to the coalition, performing emulation of the coalition by streaming a portion of the service to each device until experience is satisfactory, and continuing by transmitting the service to the devices, capture interactions on the devices by users, the interactions comprising at least gestures, taps correlating to messages of quality of experience, adapt the coalition by managing user inputs conveying quality of experience, maintaining synchronization of the devices, and maintaining the service when one or more of the devices cease to participate, and terminate the coalition.

12 Claims, 11 Drawing Sheets

(56) References Cited

U.S. PATENT DOCUMENTS

| | | | |
|---|---|---|---|
| 7,359,724 B2 * | 4/2008 | Torvinen | 455/518 |
| 7,386,798 B1 * | 6/2008 | Heikes et al. | 715/752 |
| 7,516,235 B2 | 4/2009 | Feig | |
| 7,899,915 B2 | 3/2011 | Reisman | |
| 8,204,995 B2 * | 6/2012 | Sathish | 709/227 |
| 8,341,207 B2 * | 12/2012 | Werner et al. | 709/202 |
| 2007/0168553 A1 | 7/2007 | Jones et al. | |
| 2008/0137690 A1 | 6/2008 | Krantz et al. | |
| 2010/0306671 A1 * | 12/2010 | Mattingly et al. | 715/753 |

FOREIGN PATENT DOCUMENTS

| | | | |
|---|---|---|---|
| WO | 2007/137137 A2 | 11/2007 | |
| WO | WO 2007137137 A2 * | 11/2007 | |

OTHER PUBLICATIONS

W. Yu, D. Xuan, B. Graham, S. Santhanam, R. Bettati, W. Zhao, An Integrated Middleware-Based Solution for Supporting Secured Dynamic-Coalition Applications in Heterogeneous Environments, Proceedings of the 2001 IEEE Workshop on Information Assurance and Security, US Military Academy, West Point, NY, Jun. 5-6, 2001, pp. 259-264.

* cited by examiner

METHOD AND SYSTEM SUPPORTING MOBILE COALITIONS

FIELD OF THE INVENTION

This invention relates to systems and methods for mobile services and entertainment, 4G networks, multi-mode devices, and mobile user quality of experience (QoE). More specifically, the present invention relates to methods and systems for enabling pooling of resources of multiple devices and synthesizing a temporary but enriched, coordinated media experience.

BACKGROUND OF THE INVENTION

Today's multi-media services are designed to be delivered to—and rendered upon—a single device, such as videos played on a single device's screen while audio, whose signals are interleaved with the video information, is played over that same device's speakers. However, if a given user's device is not capable of rendering a full experience due to technical or network limitations, there is currently no way for that user to experience the media. Services may be encoded for increasing experience levels. With respect to downloading, the user's device may not have a network interface capable of receiving the full multimedia experience over a single network connection, or the device itself may not have input-output capabilities to render the full experience. In addition, with respect to uplink to server and device capabilities, they may not have sufficient bandwidth for sensed data to be sent up to the server and/or the device itself may not be able to gather from users, sense, or post all the data required by the service. Hence there is a need for determining how to arrange for, manage, and deliver a service when the service's requirements exceed the capabilities of a single network connection and a single mobile device. Indeed, collaborative, cooperative, competitive, head-to-head play are now intrinsic parts of the mobile culture, as evidenced by devices and applications such as those by Sony Corporation, Apple®, Nintendo® and Microsoft®.

Prior solutions have failed to address or incorporate the notion of network capabilities and the stylized set-up of mobile "parties" using cellular devices (by "party" we mean a set of users coming together to experience multimedia content; entertainment is the main use case but the content may not be limited to entertainment and could be related to business or operations of any kind, for example, surveillance, dance, healthcare, etc.). Further, prior solutions do not detect when services can spontaneously be available and associate them with capabilities of surrounding networks and/or mobile devices. Prior solutions do not support user interfaces for party set-up and do not address resynchronization through user interface gestures. Some mobile gaming and entertainment systems use short range communications (such as Bluetooth®) as a means to synchronize so-called "head to head" game-play. Streaming multiple data streams and multicast to multiple devices is a known art, such as the use of a session server to manage the transmission of separate streams.

However, the concept of mobile ad hoc parties in which cellular phones or other mobile and fixed devices come together to deliver a unified service in which each plays a distinct role, has not been examined.

SUMMARY OF THE INVENTION

A collection of devices has more cumulative capabilities than any single device within that collection but only if a mechanism exists to coordinate the collection of devices. The present invention provides such a mechanism by establishing methods for collections of devices to pool resources in order to synthesize an enriched, coordinated media experience across the collection of devices.

The invention embodies a series of challenging steps that involve a group of mobile and/or fixed device users, the coordination required to get them physically co-located and ready, and the systems interactions that initiate the delivery of a multimedia service to each device so that in combination a rich service is experienced via co-location.

The novel invention supports the set-up, configuration, and adaptation of devices in groups. The groups comprise a set of users who are physically co-located. The invention might result in a single multimedia service being delivered over the network in separate distinct streams to the devices in the group. Only when the devices physically co-locate can the services described herein be experienced with maximum effect.

A system for supporting mobile coalitions can comprise a plurality of devices including at least a master device, a server, such as computer or device playing a server role, having a service executable by the master device, and one or more modules operable on the plurality of devices and the server, the modules operable to recommend formation of a coalition based on the service, invite one or more of the plurality of devices to participate in the coalition with the master device, set up the coalition by determining the one or more devices to participate in the coalition, launching on each participating device a link to the coalition, performing emulation of the coalition by streaming a portion of the service to each participating device until experience is satisfactory, and continuing by transmitting the service to the participating devices, capture interactions on the devices by the users, the interactions comprising at least gestures and taps that correlate to messages of quality of experience, adapt the coalition by managing user inputs conveying quality of experience indicators, maintaining synchronization of the participating devices, and maintaining the service when one or more of the participating devices cease to participate, and terminate the coalition.

In one aspect, the modules are further operable to group the devices into sets that can receive information streams together, inform the devices of a time and location for the coalition, and request agreement to participate from each of the devices in response to the invitation to participate. In one aspect, grouping the devices into sets that can receive information streams together is done with assistance from end users who view a module-generated visual metaphor on one or more screens and use the metaphor as a interactive assignment mode to assign a coalition aspect to each device. In one aspect, the modules are further operable to analyze the service requested in accordance with whether the service can be delivered in entirety to the coalition, the analyzing comprising one or more of analyzing networks in range of the master device and the participating devices, analyzing available bandwidth of the master device and the participating devices, analyzing processing, display, and networking capabilities of the devices, and analyzing availability of potential coalition device participants, and analyzing metadata to determine how coalition devices should be physically co-located with each other. In one aspect, the devices register their location, availability and capabilities with the server in a canonical syntax. In one aspect, the modules are further operable to contact the devices, obtain agreement to participate in the coalition from at least one of the contacted devices, and inform each of the devices having agreed to participate of the time and location of the coalition and how to co-locate each device relative to the other participating devices.

A method for supporting mobile coalitions for entertainment can comprise recommending formation of a coalition based on a service selected from a master device or third party, and inviting one or more devices to participate in the coalition with the master device, setting up the coalition by determining the one or more devices to participate in the coalition, launching on each participating device a link to the coalition, performing emulation of the coalition by streaming a portion of the service to each participating device until experience is satisfactory, and continuing by transmitting the service to the participating devices, capturing interactions on the devices by the users, the interactions comprising at least gestures and taps that correlate to messages of quality of experience, adapting the coalition by managing user inputs conveying quality of experience indicators, maintaining synchronization of the participating devices and maintaining the service when one or more of the participating devices cease to participate, and terminating the coalition.

In one aspect, recommending further comprises grouping the devices into sets that can receive information streams together, informing the devices of a time and location for the coalition, and requesting agreement to participate from each of the devices in response to the invitation to participate. In one aspect, grouping the devices into sets that can receive information streams together is done with assistance from end users who view a module-generated visual metaphor on one or more screens and use the metaphor as a interactive assignment mode to assign a coalition aspect to each device. In one aspect, the method analyzes the service requested in accordance with whether the service can be delivered in entirety to the coalition, the analyzing comprising one or more of analyzing networks in range of the master device and the network associations of participating devices, analyzing available bandwidth of the master device and the participating devices, analyzing processing, display and networking capabilities of the devices, analyzing availability of potential coalition device participants, and analyzing metadata to determine how coalition devices should be physically co-located with each other. In one aspect, the devices register their location, availability and capabilities with the server in a canonical syntax. In one aspect, setting up further comprises contacting the devices, obtaining agreement to participate in the coalition from at least one of the contacted devices, and informing each of the devices having agreed to participate of the time and location of the coalition and how to co-locate each device relative to the other participating devices.

A computer readable storage medium storing a program of instructions executable by a machine to perform one or more methods described herein also may be provided.

BRIEF DESCRIPTION OF THE DRAWINGS

These and other features, benefits, and advantages of the present invention will become apparent by reference to the following figures, with like reference numbers referring to like structures across the views, wherein.

DETAILED DESCRIPTION

Figure 1:
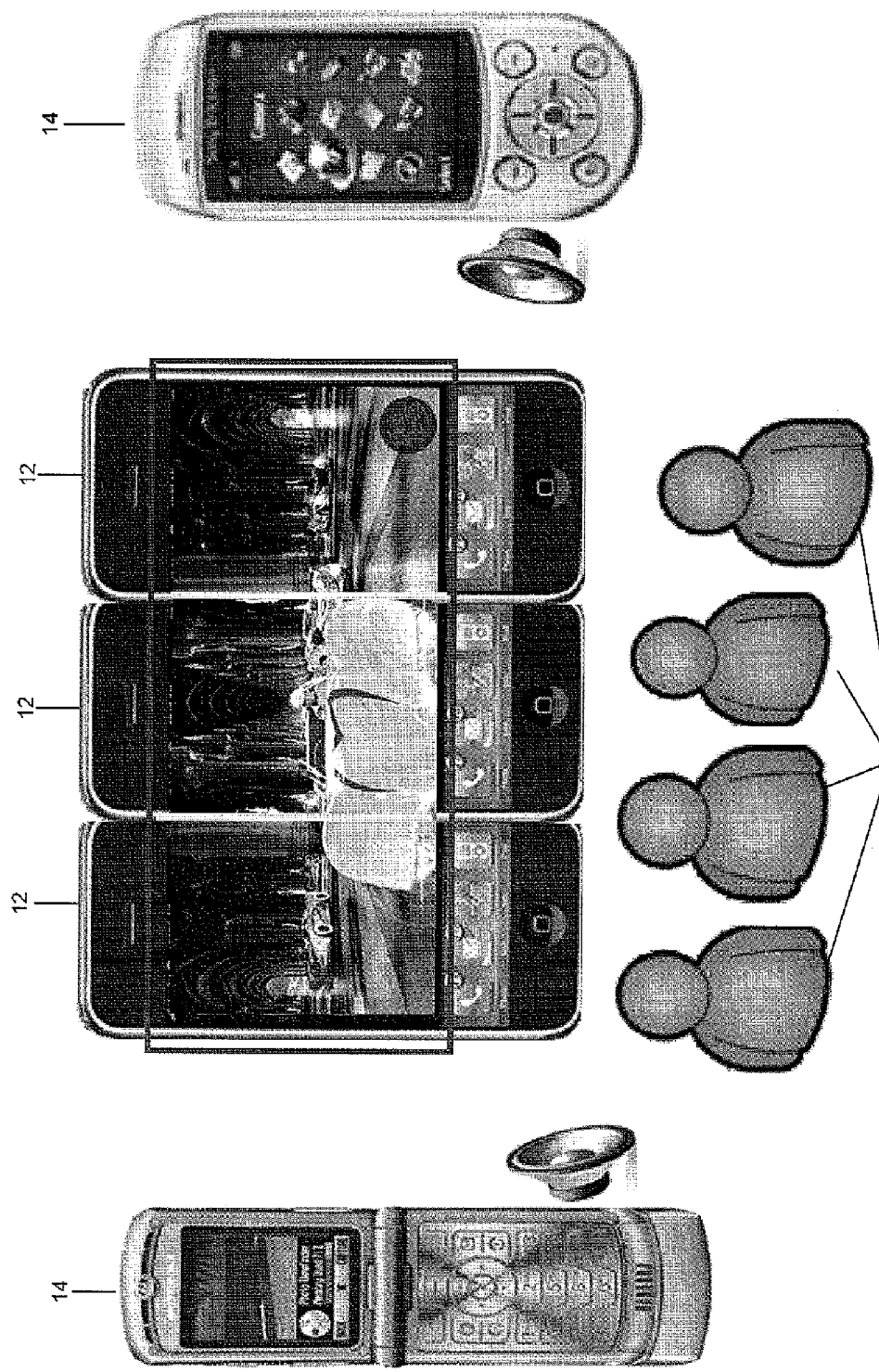
FIG. 1 depicts a solution sketch of a particular scenario of the invention.

For purposes of the description in this application the following definitions shall apply.

Coalition—Two or more devices configured to temporarily render a service; each device is configured to render one or more of the media comprising the service.

Device: any device, e.g., mobile telephone, personal computer, television, etc., with wireless-connectivity capability; in one embodiment, a device is a mobile device having a CPU taking part in the coalition.

Mobile Party/Party: the delivery of a service to multiple devices (e.g. a coalition) with some sort of synchronization which may be fine or very coarse.

Server: a computing platform separate from the devices, for example, accessible over an Internet.

Service: a service, e.g., a movie, an annotated slideshow, etc., to be delivered to one or more devices in a coalition. When the service is chosen, customized and delivered to a set of particular endpoints it is called a party.

User: owner/operator of a device participating in coalitions.

The inventive system's software/hardware components can reside on the device, the server, or any combination of device and server so that the system flows described herein can occur. Some aspects, however, such as the human interface that gathers input from users and the streamed media, must, by definition, be visible on the device screen.

Highly experiential services are services that are rich and relatively demanding on either network, hardware, or both in comparison to services such as voice, Web browsing, and SMS. High experience services can also include those that are equally (or more) fun when experienced in a small co-located group, and/or services that require (or are best when using) more input/output components than typically found on a single mobile handset, e.g. two QVGA screens, disparate sound sources, etc. Examples include but are not limited to movies, interactive movies, music videos, multi-channel audio applications, etc.

Highly experiential services and presentations are more and more viable and popular as media becomes more and more rich. The inventive solution presented herein comprises a method and a system to allow a high-experience service to be initiated from, and delivered to, a number of temporarily federated devices to create a greater user experience than could otherwise be achieved with a single device. Novel assignment and synchronization mechanisms are used, as discussed below.

Overall, the solution includes the following aspects: coalition recommendation, such as inferring that a given user should seek a coalition to visualize something of interest, grouping people together into sets that can receive information streams together using features such as messaging, Web Portal, etc., planning, e.g., applying heuristics to make best use of the capabilities of the devices on hand, and coalition interaction and conveyance (to the server side), such as communicating with the server side to determine what sorts of encoding, streaming, and synchronization is possible and using this information to guide coalition set-up on the client (mobile) side. In this aspect, the grouping can include, for example, helping people plan where to be, at what time, and with what devices.

Another aspect is coalition set-up. This aspect can include coalition set-up (mobile side), and registration, and user-interfacing via a graphical user interface (GUI). Yet another aspect can be coalition adaptation, such as recovery and healing during service delivery from devices that leave or fail, and/or from new devices that enter, and/or from latency and poor synchronization between streams. Still another aspect can be coalition termination.

FIG. 1 depicts a solution sketch of a particular scenario of the invention. Several devices have already been formed into a coalition and the so-called party is in progress. A streaming movie is split across the screens of several mobile devices while the sound (or other information) is coming from yet more devices in the coalition. Specifically, FIG. 1 shows four mobile users 10 and five devices 12, 14 coming together to render a movie in high-experience mode. Three of the devices 12 perform a video function; these devices are placed or held together to create the movie screen. In the example of FIG. 1, each device 12 has an effective screen of 480×320 or 153,600 pixels. However, the combination of three video devices 12 results in an effective screen of 480×960 or 460,800 pixels. Also, devices 14 are dedicated to the audio function, which increases the audio quality. In this example, the three video devices 12 each receive separate video streams. The two audio devices 14 receive complementary audio which may include (but not be limited to) 5-channel "surround"-style audio soundtrack, or audio commentary. Each device has one or more links to the wireless network.

The process for performing the automatic coalition recommendation aspect of the present invention is presented with respect to a user B and a high experience service S. In one embodiment, B initiates the commencement of the service S. In yet another embodiment the system suggests service S to B. The inventive functionality to achieve this analyzes (to the extent possible) the following: the set and requirements of all the current services available to B at the moment, the service S (if it was requested specifically), including whether S can be delivered via a coalition, the wireless networks in range near B and other devices, the available bandwidth (via OSS or models), B's device capabilities, and mobile users nearby (possible coalition peers from a registry of participants, their locations being tracked by known methods such latitude/longitude logging via the GPS programming interface). The device capabilities of B and other devices can include processing, display and networking capabilities. Metadata can be analyzed to determine how coalition devices should be physically co-located with each other. In one embodiment, these users can 'register' their location and availability, using any method.

When the service S is coalition-compatible, the server derives a coalition of compatible users and/or devices for S by choosing a user for each capability from the available set of users. This selection may also be influenced by B's social group or preferred partners. The server sends a message to B indicating that a coalition could be formed with B as the 'leader'. B can decline the recommendation to form a coalition.

When B agrees to service S and to the recommendation to form a coalition, the server contacts the users (via their mobile devices) who comprise the proposed coalition to obtain their agreement to participate. These users can agree to form a coalition and can get together; this is discussed in more detail below with respect to the coalition set-up aspects. In one embodiment, users are informed of a future time T and location L to meet at, based on one or more of the user's current location(s), e.g., user B's location since she is 'leader'. A future time T can be generated by examining both the availability of potential participants and their distances to B and then computing reasonable arrival times given all their locations (for example, assuming a mode of transfer such as automobile, if participant P is 3 miles from B the system might estimate that the future time to be 3/v hours (where v is a reasonable velocity in m.p.h.))

The process for performing the coalition set-up aspect of the present invention is presented. A group of co-located mobile users M, N, O, P agree to begin a coalition to experience service S. Software on their devices is either triggered by the inventive server (e.g., via an SMS message) or is launched by the user. This software links the users' devices via a short range communication protocol, e.g., Bluetooth®, and preferably displays a graphical user interface on each device. Each device's capabilities are inter-communicated in a machine readable format such as XML whose semantics are understood by all system components. If not already chosen, a master device M is selected, either manually by a user interaction with the software on the device, a voting mechanism between users M, N, O, P, or other approach.

In one embodiment, an intuitive visual metaphor is chosen to represent the service functions using visual constructs that are both relevant and familiar, e.g., a movie theatre, living room, arcade, etc. In one embodiment M assigns roles to all the devices in the coalition for the delivery of service S. M does this manually or partially assisted by a recommended matching of devices to media streams the module compares canonical representation of device capabilities to requirements of service S). Each device connects and synchronizes to all of the other devices to agree on the assignments. In addition, each device registers with the server of the inventive system. The server, or optionally a user, initiates a test phase in which a short segment of the service S or a test service TS is streamed or otherwise emulated on the devices. In one embodiment, each device streams information representative of the media it will receive in its assignment from a URL that is conveyed to it. The participants or users are asked if they'd like to continue. When consent to continue is obtained from all or a subset of users, each device in the coalition is passed a reference to the service media(s) that are required of it. The users are reminded via an informational message of the ideal way to situate themselves and their devices to receive the service S, including (but not limited to) how to co-locate their devices relative to other devices expected in the coalition. For example, as in FIG. 6, the users may be instructed to hold their devices in a particular fashion relative to the placement of other users' devices. Then the service S begins to stream across all devices and the co-located users experience the full effect by considering the media delivered across all of their devices.

A variety of techniques can be used to assign devices 12, 14 in the coalition to functions required to render the service S. In addition to assigning devices, all of these techniques allow initiation of test capability, in which the service plays a short session so that users can determine whether the session is acceptable or appropriate. This initiation is typically activated using a "Go" button to start the service, and "Cancel" and "Pause" buttons to cancel and to pause the test session (respectively).

Figure 2:
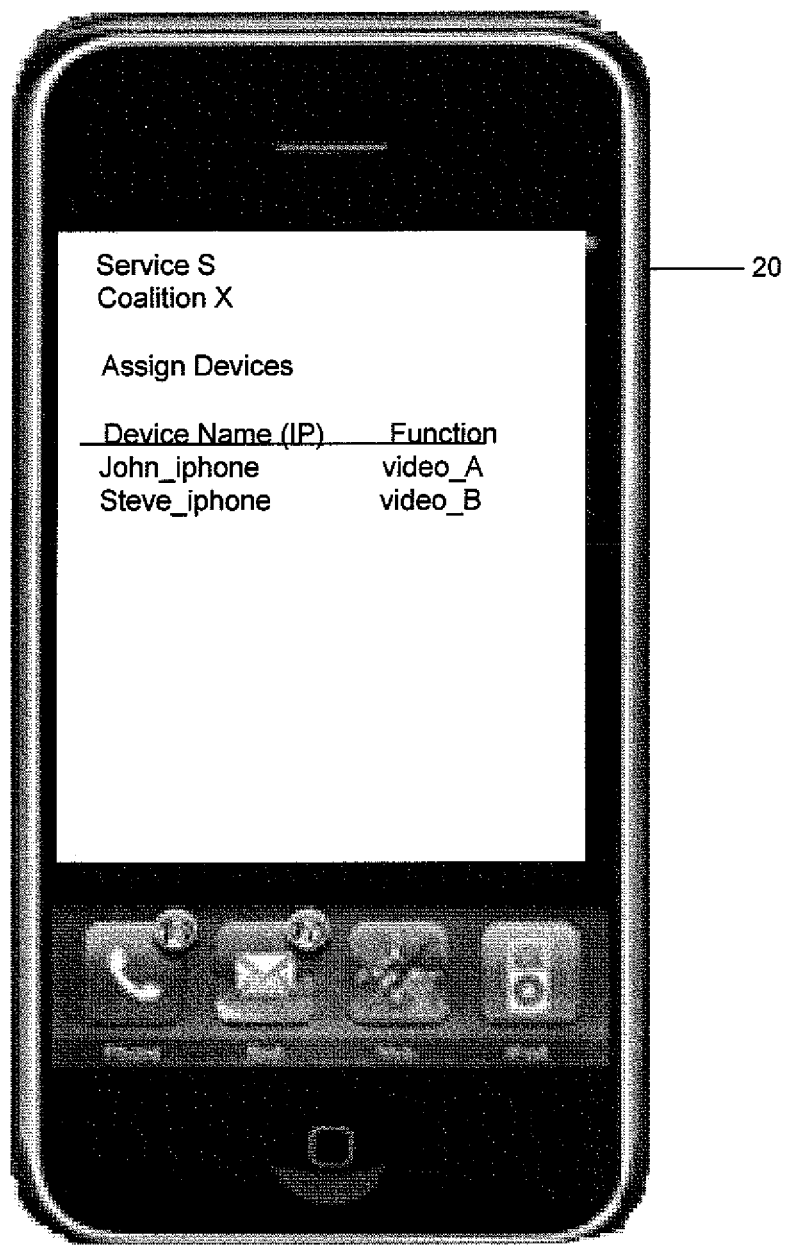
FIG. 2 shows a master device for interactions with coalition set-up components via a user interface.

FIG. 2 shows a master user (with a device 20) viewing and setting-up components of a coalition. The available device names are listed in a column on the left—these are devices corresponding to the devices involved in the coalition and hence, very likely, nearby (or if not the system will summon them via messages). Service functions are listed in a column on the right. As shown in FIG. 2, device John_iphone is assigned service function video_A and device Steve_iphone is assigned service function video_B. Thus, aspects of the service are separately and visibly called-out on the graphical interface. Available devices are also listed. A master user can make the assignment between device in coalition and service component.

Figure 3:
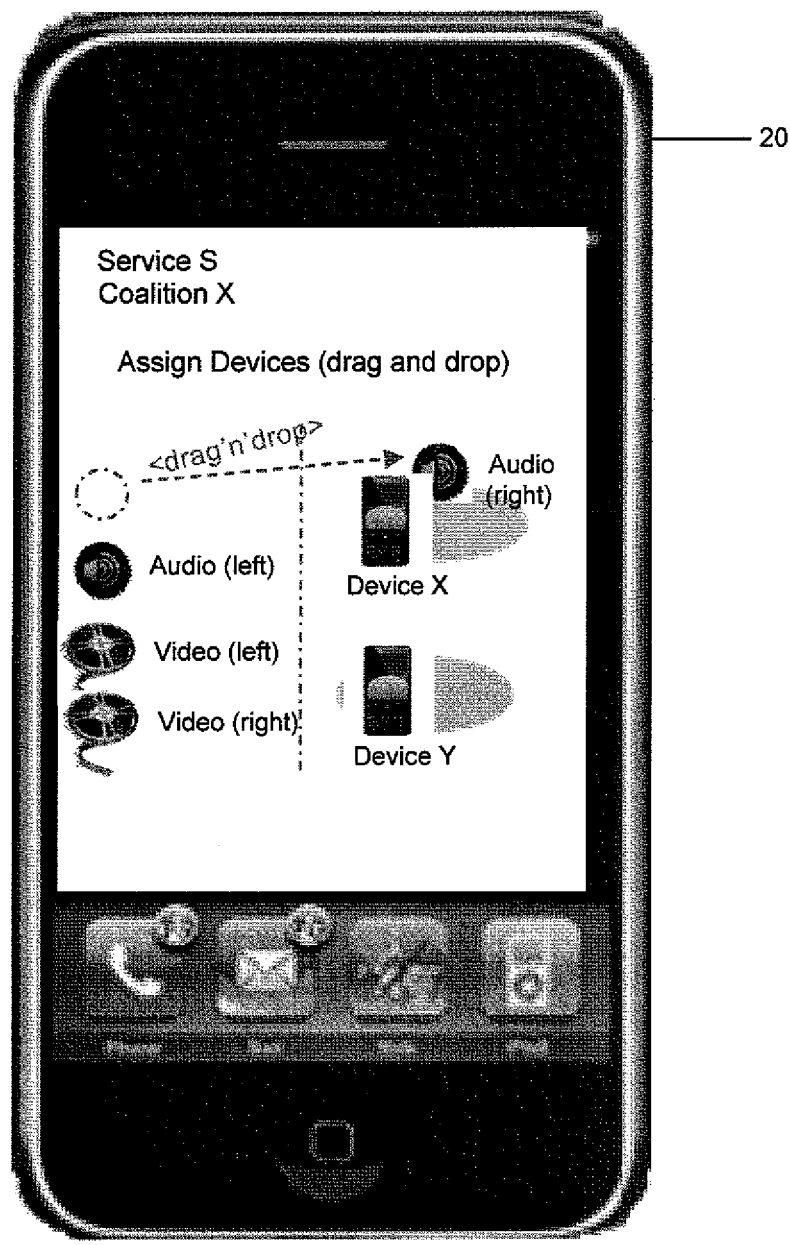
FIG. 3 shows a drag-and-drop methodology for assigning devices.

FIG. 3 shows a drag-and-drop methodology for assigning devices from the master device 20 graphical interface. The service functions are depicted as icons in the left column and the devices are icons in the right column. The user can drag a function to a device to assign that function or aspect of the coalition media to the device that the icon represents; in FIG. 3, the service function multimedia component Audio (right) is dragged to Device X. In other embodiments selection-assignment paradigms other than drag-and-drop can be used.

Figure 4:
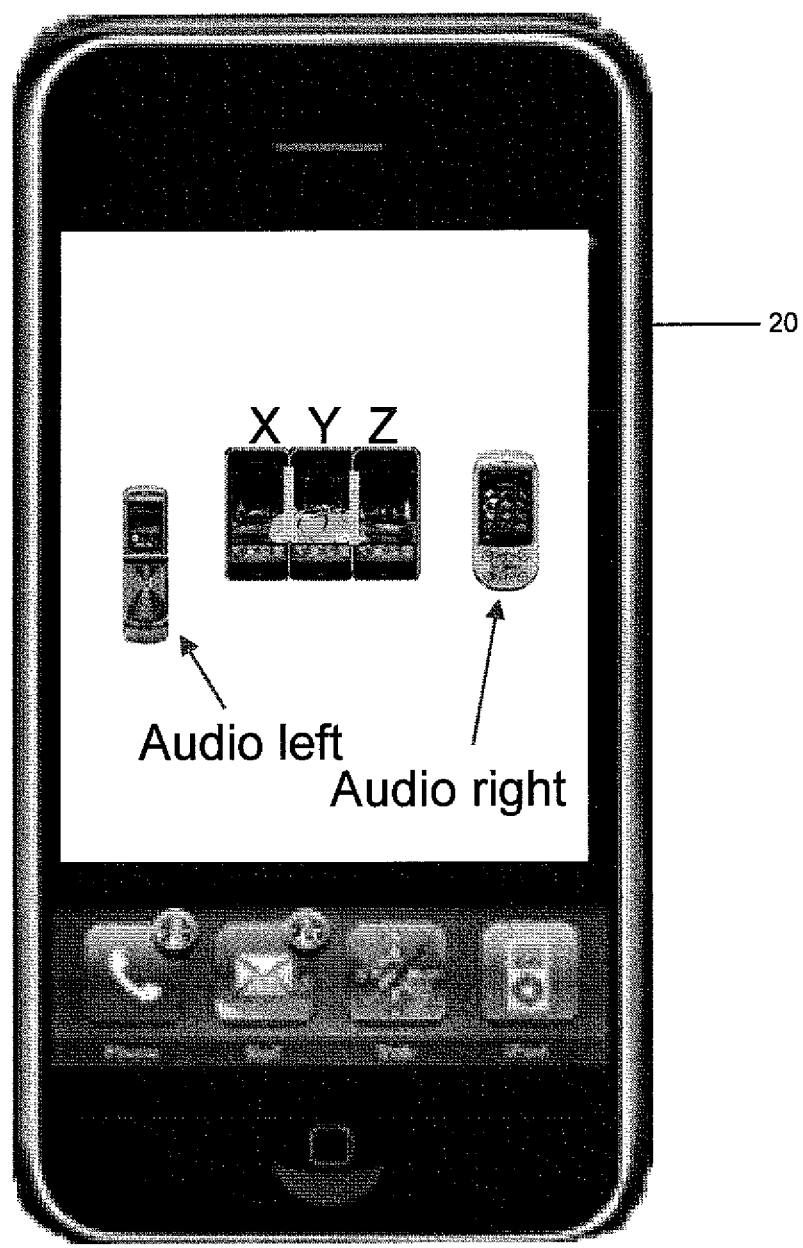
FIG. 4 shows assigning devices in the coalition to functions required to render the service using a metaphor to facilitate device assignment.

FIG. 4 shows assigning devices in the coalition to functions required to render the service using a metaphor to facilitate device assignment. In this embodiment, each class of service S that can be jointly shared has a distinct or familiar visual metaphor, e.g. movie theatre, living room, arcade, etc., on which the master user can drag and drop the participants to make assignments and reconfigurations in a very intuitive interactive fashion. The visual metaphor-assignment capability makes the party-setup happen much more fluidly and allows the users to clearly understand their device's role(s) in the coalition. FIG. 4 shows a master device 20 displaying a configuration of three video devices X, Y, Z, along with audio left and audio right devices which have not yet been assigned. The metadata describing these visual metaphors are stored in a database 500.

Figure 5:
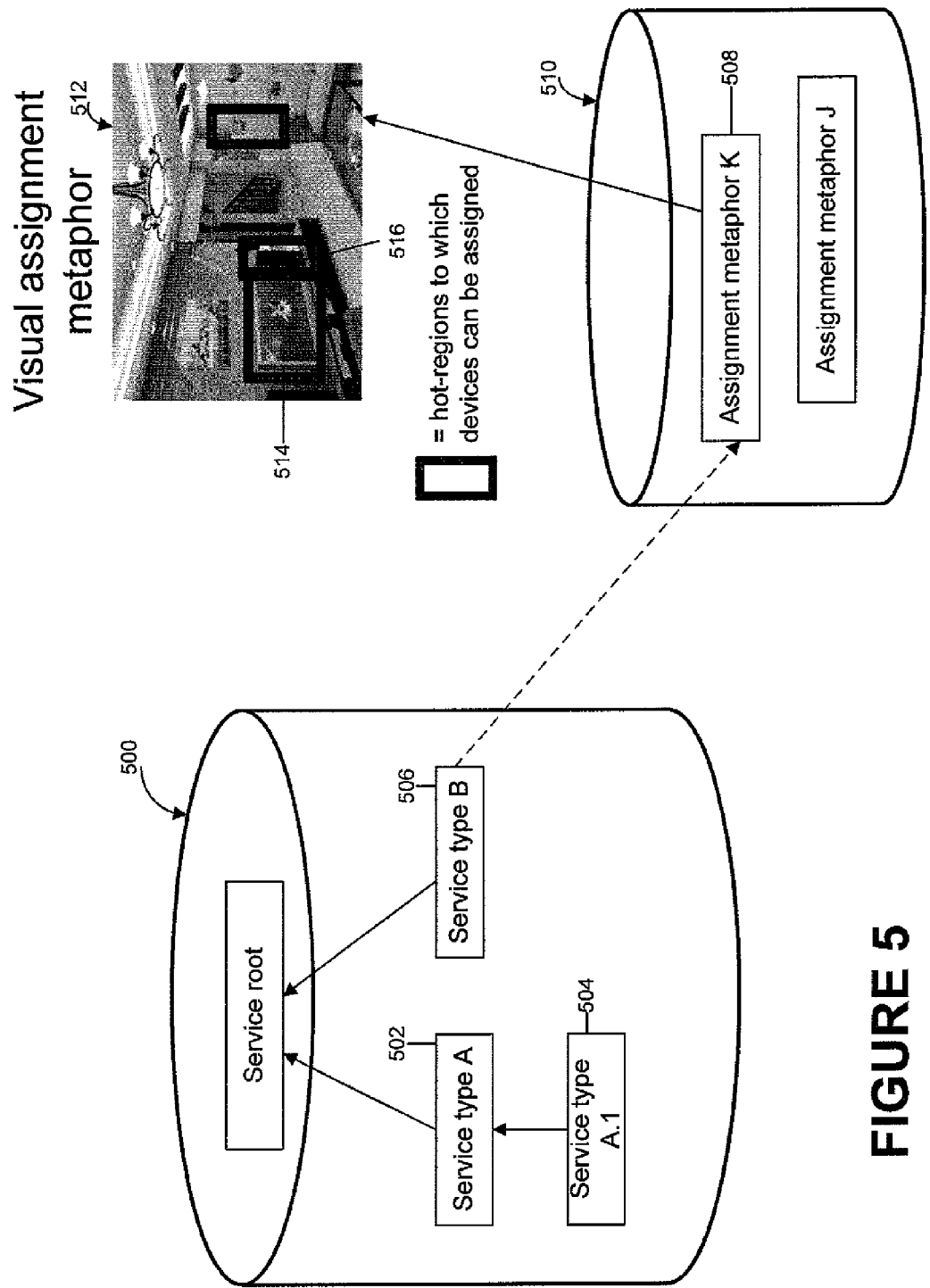
FIG. 5 shows a database with a taxonomy of services that are coalition enabled.

The inventive system can steward metadata stored in databases that facilitate many aspects of the system. FIG. 5 shows a database 500 having a taxonomy of services that are coalition-enabled. In this database 500, Service type A 502 and Service type B 506 have canonical descriptions. Each admits to subclassing as well, such that a new Service A.1 504 can be a specialized subclass of service A 502. Another database table 510 stores canonical descriptions of assignment metaphors including K 508. Assignment metaphor K 508 includes a specification that allows the device GUI 512 to read and parse the specification and create a visual metaphor for assignment described therein. In FIG. 5, the visual assignment metaphor is a living room where the functions required by the service are already represented visually in well-understood embodiments, e.g., television 512, speakers 514, etc. Well-known technologies such as Resource Description Format (RDF) or Ontology Web Language (OWL) could be syntax for aspects of the database 500. As each element of the visual metaphor on which devices are assigned is mapped to an aspect of the coalition and a particular device, this is a highly novel and effective way for users to self-configure their parties.

In another embodiment, the server instructs the devices how best to align themselves to render the service in a preferred manner. In this embodiment, the inventive system uses heuristics, metadata, and preferences to make the assignments and device alignments. For example, the system could try to keep the device 12 with the highest resolution screen display as the center video display device in the coalition. As an example, before final assignment, the server sorts the devices based on screen width parameter to find the one W with the widest screen; it then ensures that if there are three screens in the assignment that W is the one assigned to slot 2 (of 3) so it is in the "middle" and conveys this to the users as well via the user interface.

The process for performing the coalition adaptation aspect of the present invention includes managing user inputs conveying quality of experience indicators, adapting to device failure leading to loss of device(s) from coalition and synchronization issues. As long as the coalition exists, devices ping the server (or the server pings the devices) to indicate their presence in the coalition. Alternatively, the server can infer device participation through receipt of service packets from the device. If no pings are received or a period of inactivity is detected, the server can adjust the coalition rendering in real-time. For example, if one of two devices serving as video screens in the coalition is detected to have left the coalition, then the server simply sends the video in whole to the video screen of the remaining device and updates its knowledge of the participants. In another possible scenario, if the master is detected to have left the coalition then the coalition is abandoned, the service ends, and all participants get a message to this effect.

A manual tapping method is an inventive mode to enable end users to affect the relative synchronization of the streams displayed on their devices relative to the other devices in the coalition. In effect, the coalition service S playout can be effectively managed and adapted through these interactions. For example, coalition service S is playing out upon the devices of several parties. One of the devices D is out of sync and its imagery is "running behind" the stream arriving on the other devices (e.g., perhaps the right-most movie screen in the 1×3 matrix). This is a problem in this case as D is but one device being used as a video display and its loss of synchronization degrades the quality of the coalition. The user of device D taps on the screen, in a predefined region, at a predefined rate of tapping, to thereby instruct the system to speed up or jump ahead, or, alternatively to slow down. Synchronization messages are captured on the local device (e.g., D) marshaled into messages, and sent to the server. Upon receipt of these messages, the server parses the message and understands that device D is "out of sync" and thus can readjust the stream to compensate, depending on the type of taps that were issued.

Figure 6:
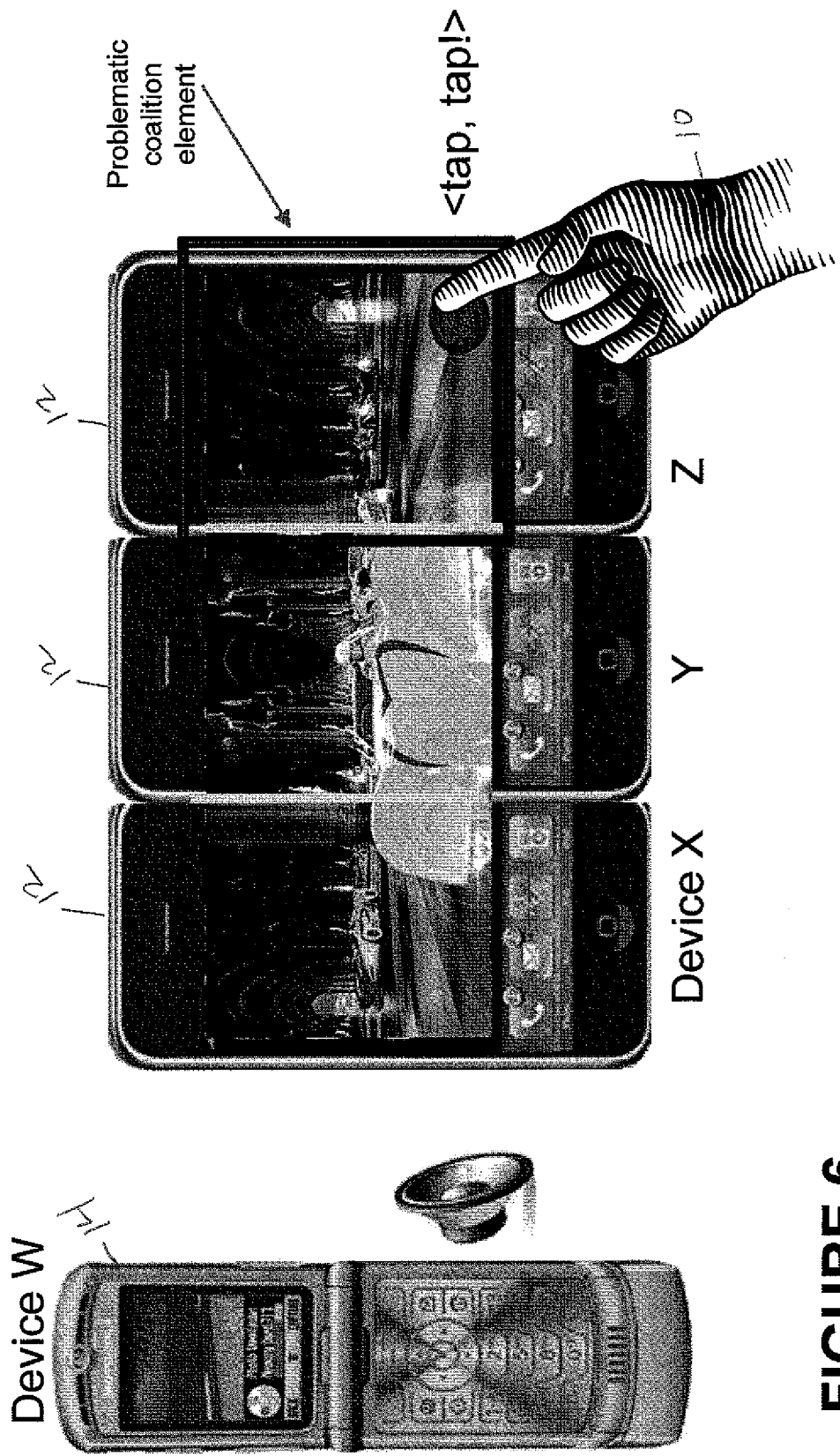
FIG. 6 shows a manual tapping method in which users can fix synchronization issues via touch-screen interactions.

Another embodiment, Adaptation Method Flow, is shown in FIG. 6. A coalition (also referred to as a party) is running with devices W, X, Y, Z 12, 14. Suppose screen Z runs behind in synchronization. Z's user notices that his screen is a few moments behind the others in terms of temporal sequence, and a user 10 taps on the screen of Z to indicate it needs to be resynchronized or adjusted. The taps are captured, interpreted, and marshaled into 'sync messages' by the inventive software and the messages are conveyed to the server and/or other software and/or hardware components. In response to the messages, the synchronization issue comes to be understood by the receiver of the messages and streaming can be adjusted using an appropriate technique. User taps on various parts of Z's screen can indicate different Quality of Experience (QoE) issues being experienced by the user. The taps and screen areas can be preconfigured and/or overlaid on the screen during set-up. For example, it could be known to the user that the screen is divided into 4 evenly sized rectangular regions R1, R2, R3, R4, such that taps on R1 indicate synchronization QoE issues, taps on R2 indicate packet loss or video quality issues, taps on R3 indicate color issues, and taps on R4 indicate jitter issues.

The process for removing a device from the coalition is presented. In some situations, it may be necessary to remove a device from the coalition in-session. For instance, one user—say Z—may want to physically leave and thus break the coalition consisting of X, Y and Z. To indicate this, Z performs a special tap on his mobile touch screen or selects the 'remove device' function from a menu option on the graphical user interface. The inventive system responds by examining remaining devices of the same class (e.g., X and Y in this case), the session attributes, and the service attributes to determine if the coalition can continue without Z. If the networks to which X, Y are connected are capable of fully supporting the new coalition and the server, e.g., media server, can stream media to the new coalition, for example, if two video screens instead of three are sufficient for the coalition, then device Z can indeed leave without necessitating a termination of the entire coalition. In this case, the process can stop or pause the service on all remaining coalition members and remove the device Z. Further, if Z was the master device, then a new master device can be delegated. In addition, all remaining coalition members can be informed of adjustments and the server can be informed of the new requirements for media. Finally, service can be resumed with the new coalition. Network capabilities can be inferred or discovered via any means necessary. One method is described in the IEEE 802.21 standards documents.

Otherwise, if Z is indeed necessary to the functioning of the coalition then the coalition is no longer feasible after Z has left. In this situation, the coalition is terminated and a terminate message is sent to all members and to the server.

Figure 7:
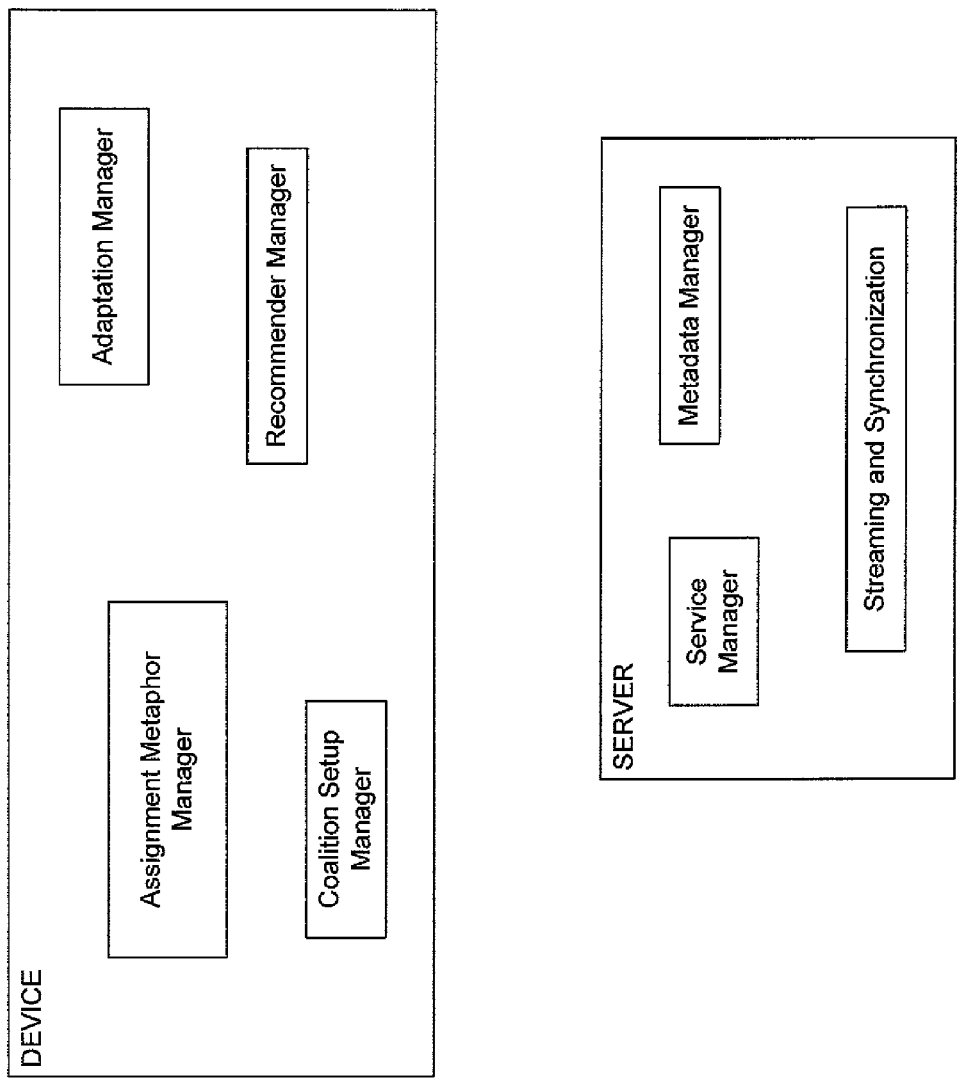
FIG. 7 shows logical components of an embodiment of the inventive system.

FIG. 7 depicts logical components in one embodiment of the inventive system. As shown in FIG. 7, the system can comprise a device and a server. The device can include an adaptation manager (AM), an assignment metaphor manager (AMM) and recommender manager (RM) and a coalition set-up manager (CSM). These logical components steward particular data and logic and occasionally interwork to achieve the inventive flows. AMM stores a representation of the visual metaphor used to help the master user assign devices to the coalition and also stores this assignment. The AM conveys to the user how interactions can affect the coalition, catches the interactions (e.g., taps on the screen) and marshals an appropriate message towards the server. RM presents an interface to show the user the possibilities for coalitions at a given moment and place and gathers user input. CSM ensures that all devices in the local coalition are receiving messages and is responsible for understanding their readiness. The server's logical components can include a service manager (SM), a metadata manager (MM) and a streaming and synchronization (SS) component. MM stores and reads metadata about services, users, and devices and answers queries posed by other components. SS interprets messages regarding synchronization issues and is able to affect adaptations of the service (in coordination with SM). SM manages the service requirements and the execution of the various streams and synchronization. It may launch other processes and applications to do so.

Figure 8:
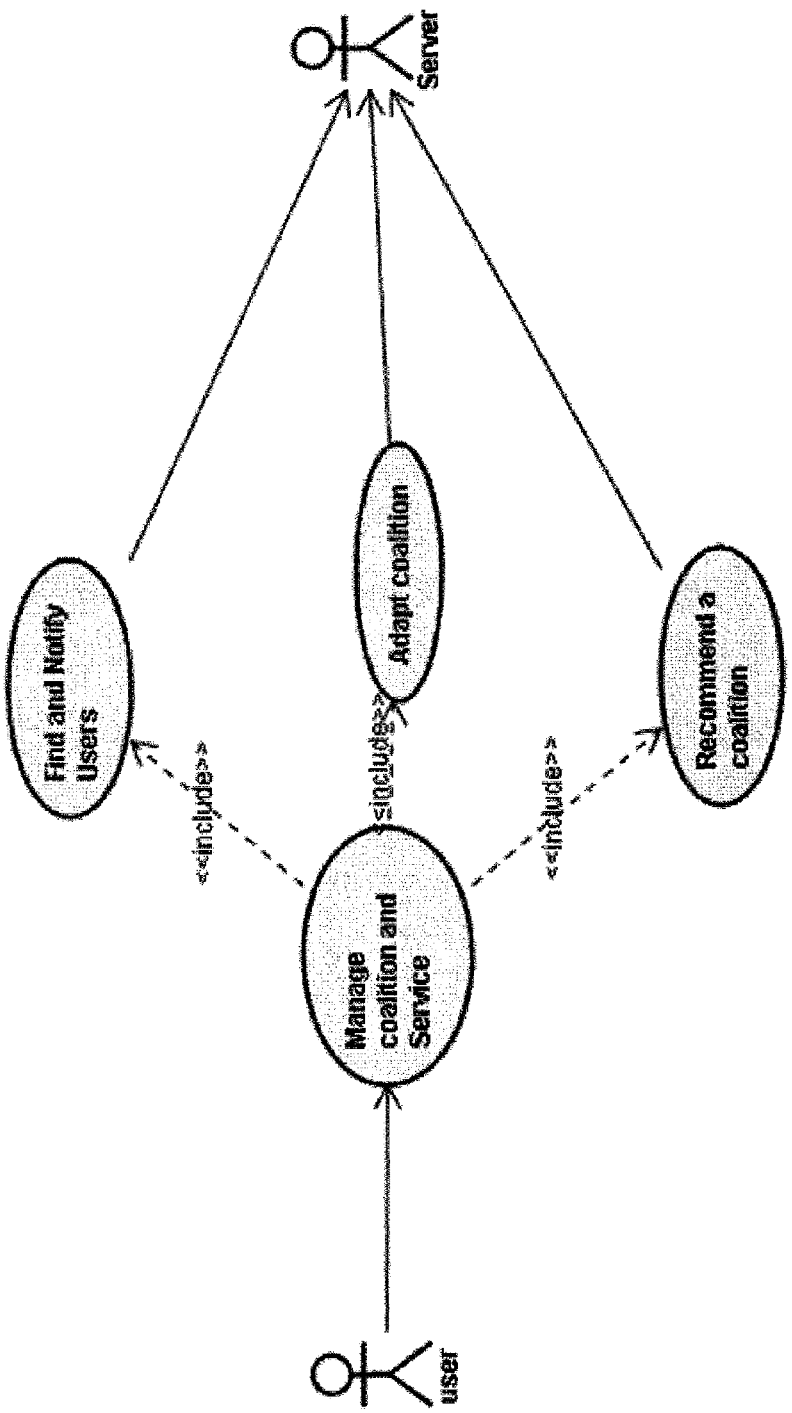
FIG. 8 illustrates system use cases.

FIG. 8 depicts use cases of the present invention. The invention allows users to manage coalitions and services. In one aspect, this involves recommendations made by the server to the user for new coalitions. In another aspect, this involves finding and notifying nearby users that a coalition is a possibility. In another aspect, this involves adapting the coalition based on inputs or actions from the users. The server may be invoked.

Figure 9:
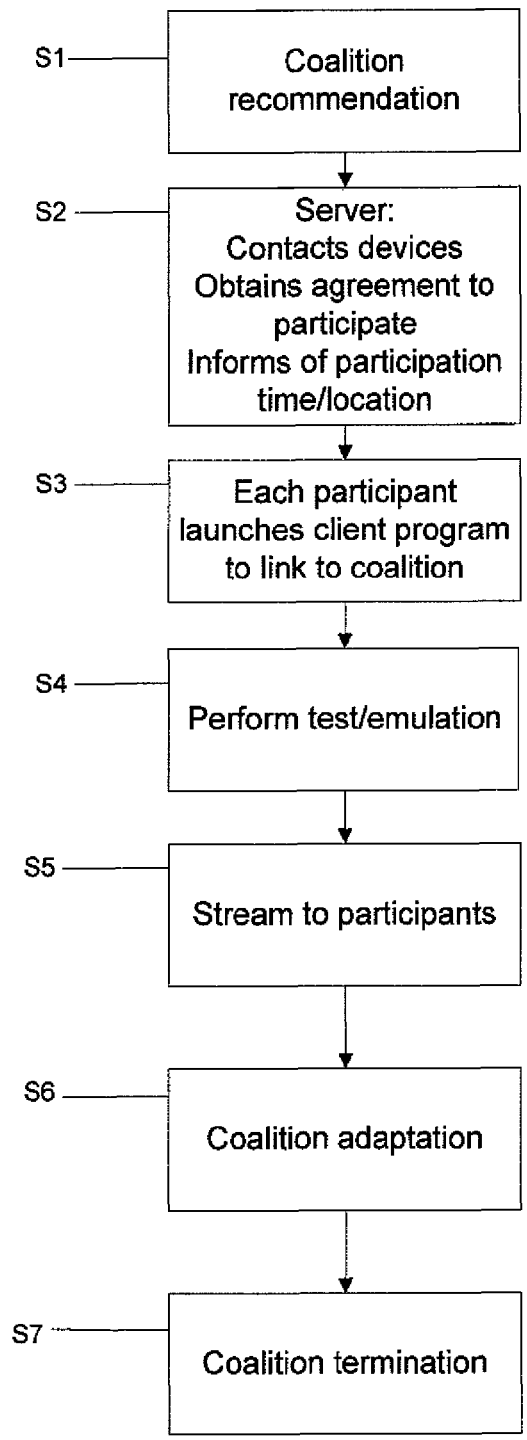
FIG. 9 is a flow diagram of the present invention.

FIG. 9 is a flow diagram of the overall inventive method. Step S1 is coalition recommendation; this process is described in more detail in FIG. 10. Steps S2-S5 are coalition set-up. In step S2, the server contacts the devices and users who comprise the possible proposed coalition, obtains their agreement to participate and informs them of the time and location for participation. Each user or participant initiates software in step S3 to link his or her device into the coalition. In step S4, an emulation or system test is performed, emulating the coalition for the participants. The coalition or party begins in step S5 when information is transmitted to participants, possibly by real-time streams. Step S6 is coalition adaptation; this process is described in more detail in FIG. 11. Step S7 is coalition termination.

Figure 10:
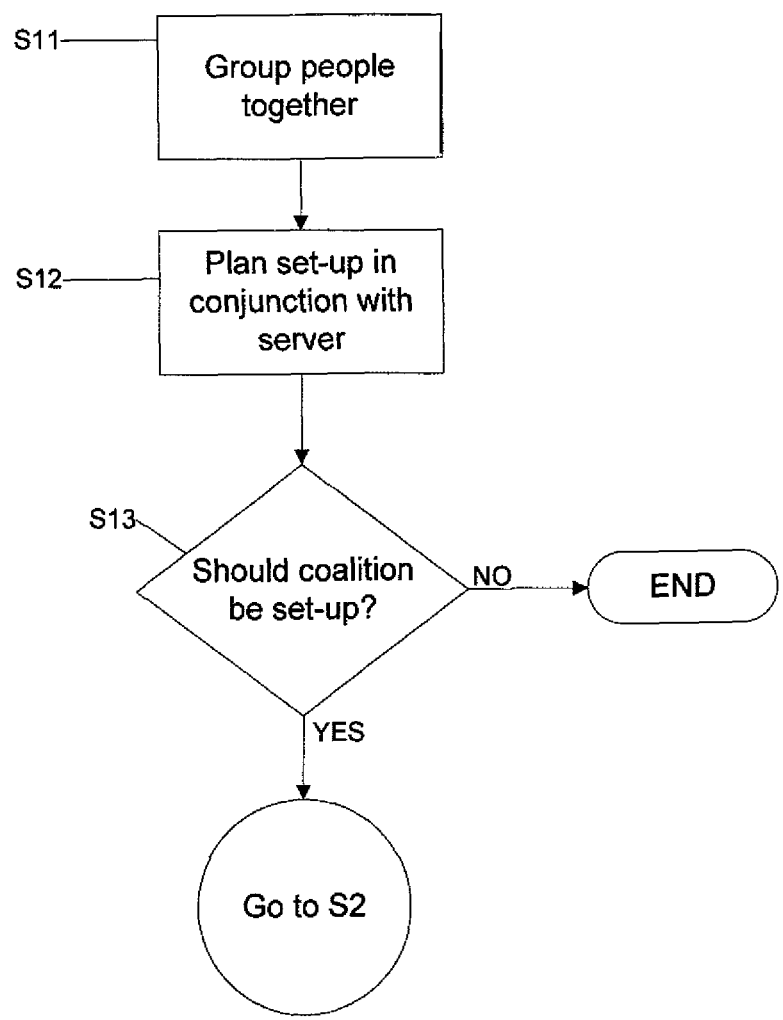
FIG. 10 is a flow diagram of the automatic coalition recommendation aspect of the present invention.

FIG. 10 is a flow diagram of the coalition recommendation process. In step S10, the need or desire to seek coalition occurs. In step S11, group potential coalition participants together. In step S12, plan how to set-up the coalition in conjunction with the server. This plan can include plan time, location, which device can be used for what aspects of the coalition, etc. In step S13, a choice is made whether or not a coalition should be set-up—this is based on whether the users are available or are nearby, and whether their devices, in aggregate, have the capabilities implied by the service requirements. If so (S13=YES), the coalition can be set-up using GUI. Optionally, the system can set-up the coalition without the GUI and without user interaction. Otherwise (S13=NO), the process terminates.

Figure 11:
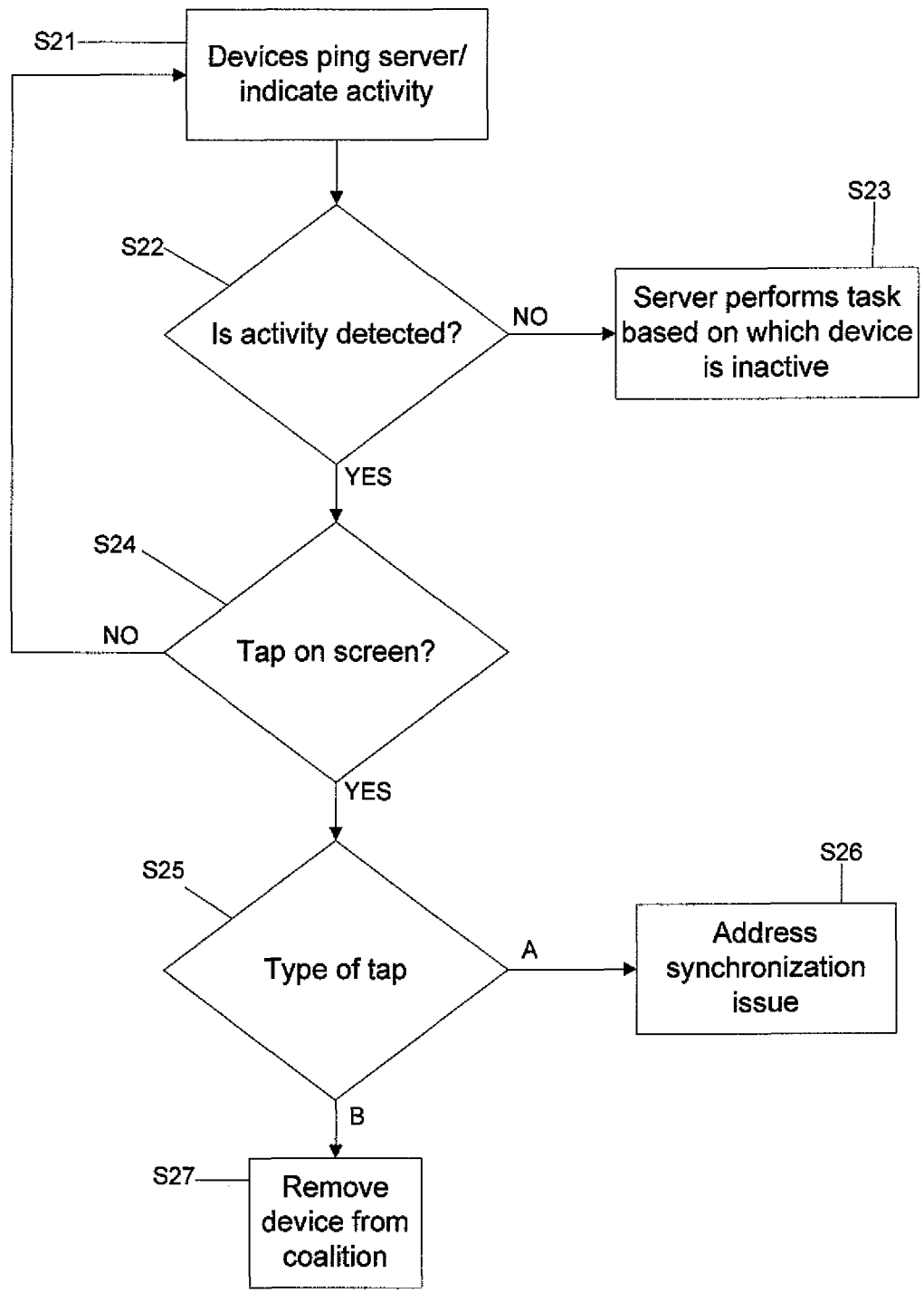
FIG. 11 is a flow diagram of an embodiment of the coalition adaptation aspect of the present invention.

FIG. 11 is a flow diagram of an embodiment of the coalition adaptation process. In step S21, devices ping the server (or the server pings the devices) to indicate their presence in the coalition. Alternatively, the server can infer device participation through receipt of information packets from the device. If no pings are received or a period of inactivity is detected (S22=NO), in step S23 the server performs a task based on the device that is inactive or not pinging. For example, if one of two devices playing the roles of video screens is inactive or not pinging, then the server performs a task of sending the video in whole to the video screen of the remaining device that is indicating availability. In another example, if the master is the device detected to be inactive, then the server performs the coalition termination at step S7.

If pings are received (S22=YES), the process continues at step S24. In step S24, the server determines whether a tap on a screen of a participating device has occurred. If no tap is detected (S24=NO), then processing continues at step S21.

If a tap or taps are detected (S24=YES), the tap, number of taps, and/or location on the device screen of the tap(s) can indicate a process or action to be undertaken in step S25. For example, one tap (S25=A) can mean there is a synchronization issue to address. In addition, screen regions (e.g., bottom, central area, or rectangular areas, etc.) can be set aside for particular tap types. This issue is addressed in step S26. More than one tap (S25=B) can mean that the device should be removed from the coalition in step S27.

In one embodiment, users can register their devices and/or availability to participate in a coalition with the server.

Advantages of the present system and method include the following. It enables systematic creation of mobile coalitions through a series of interactive steps, and allows multimedia service content to be experienced even when no single mobile device is capable of rendering it in whole. In addition, the system and method allows resynchronization of multimedia via gestures, such as taps on a device screen. Also, an intuitive user can interface to facilitate the coalition set-up and control.

The inventive system and method includes numerous benefits. For example, end users, e.g., device owners and operators, can experience a mobile service that they may otherwise have not been able to experience in full when teaming with other devices owned or controlled by others. Mobile content providers may beneficially get revenues in pay-to-play using the inventive system and method. Mobile network providers may beneficially play the intermediary role and could generate revenues by charging for the capability of coalitions, advertisements, etc.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some functionality, which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for supporting mobile coalitions for entertainment, comprising:
a plurality of devices including at least a master device;
a server having a service executable by the master device; and
one or more modules operable on the plurality of devices and the server, the modules operable to recommend formation of a coalition based on the service, invite one or more of the plurality of devices to participate in the coalition with the master device, set up the coalition by determining the one or more devices to participate in the coalition, launching on each participating device a link to the coalition, performing emulation of the coalition by transmitting a distinct portion of the service to each participating device until experience is satisfactory, and continuing by transmitting the service to the participating devices, capture interactions on the devices by the users, the interactions comprising at least gestures and taps that correlate to messages of quality of experience, adapt the coalition by managing user inputs conveying quality of experience indicators, maintaining temporal synchronization of the distinct portions of the service to the participating devices, maintaining spatial relationships between participating devices, and maintaining the service when one or more of the participating devices cease to participate, the modules further operable to contact the devices, obtain agreement to participate in the coalition from at least one of the contacted devices, and inform each of the devices having agreed to participate of the time and location of the coalition and how to co-locate each device relative to the other participating devices, the modules further operable to group the devices into sets that can receive information streams together with assistance from end users who view a module-generated visual metaphor on one or more screens and use the metaphor as an interactive assignment mode to assign a coalition aspect to each device; and
terminating the coalition.

2. The system according to claim 1, the modules further operable to group the devices into sets that can receive information streams together, inform the devices of a time and location for the coalition, and request agreement to participate from each of the devices in response to the invitation to participate.

3. The system according to claim 1, the modules further operable to analyze a service requested in accordance with whether the service can be delivered in entirety to the coalition, said analyzing comprising one or more of analyzing networks in range of the master device and the participating devices, analyzing available bandwidth of the master device and the participating devices, analyzing processing, display, and networking capabilities of the devices, analyzing availability of potential coalition device participants, and analyzing metadata to determine how coalition devices should be physically co-located with each other.

4. The system according to claim 1, wherein the devices register their location, availability and capabilities with the server in a canonical syntax.

5. A method for supporting mobile coalitions for entertainment, comprising steps of:
recommending formation of a coalition based on a service selected on a master device, and inviting one or more devices to participate in the coalition with the master device;

setting up the coalition by determining the one or more devices to participate in the coalition, launching on each participating device a link to the coalition, performing emulation of the coalition by streaming a distinct portion of the service to each participating device until experience is satisfactory, and continuing by streaming the service to the participating devices;

capturing interactions on the devices by the users, the interactions comprising at least gestures and taps that correlate to messages of quality of experience;

adapting the coalition by managing user inputs conveying quality of experience indicators, maintaining temporal synchronization of the distinct portions of the service to the participating devices, maintaining spatial relationships between participating devices, and maintaining the service when one or more of the participating devices cease to participate;

grouping the devices into sets that can receive information streams together with assistance from end users who view a module-generated visual metaphor on one or more screens and use the metaphor as a interactive assignment mode to assign a coalition aspect to each device and terminating the coalition;

wherein the step of setting up further comprises:
  contacting the devices;
  obtaining agreement to participate in the coalition from at least one of the contacted devices; and
  informing each of the devices having agreed to participate of the time and location of the coalition and optionally how to co-locate each device relative to the orientation and position of other participating devices to best jointly receive the service in question.

6. The method according to claim 5, the step of recommending further comprising:
  grouping the devices into sets that can receive information streams together;
  informing the devices of a time and location for the coalition; and
  requesting agreement to participate from each of the devices in response to the invitation to participate.

7. The method according to claim 5, further comprising steps of analyzing a service requested in accordance with whether the service can be delivered in entirety to the coalition, said analyzing comprising one or more of analyzing networks in range of the master device and the participating devices, analyzing available bandwidth of the master device and the participating devices, analyzing processing, display, and networking capabilities of the devices, analyzing availability of potential coalition device participants, and analyzing metadata to determine how coalition devices should be physically co-located with each other to best jointly receive the service.

8. The method according to claim 5, wherein the devices register their location, availability and capabilities with the server in a canonical syntax.

9. A non-transitory computer readable storage medium storing a program of instructions executable by a machine to perform a method for supporting mobile coalitions for entertainment, comprising:

recommending formation of a coalition based on a service selected on a master device, and inviting one or more devices to participate in the coalition with the master device;

setting up the coalition by determining the one or more devices to participate in the coalition, launching on each participating device a link to the coalition, performing emulation of the coalition by streaming a distinct portion of the service to each participating device until experience is satisfactory, and continuing by streaming the service to the participating devices;

capturing interactions on the devices by the users, the interactions comprising at least gestures and taps that correlate to messages of quality of experience;

adapting the coalition by managing user inputs conveying quality of experience indicators, maintaining temporal and spatial synchronization of the distinct portions of the services to the participating devices, maintaining spatial relationships between participating devices, and maintaining the service when one or more of the participating devices cease to participate;

grouping the devices into sets that can receive information streams together with assistance from end users who view a module-generated visual metaphor on one or more screens and use the metaphor as a interactive assignment mode to assign a coalition aspect to each device; and terminating the coalition;

wherein the setting up further comprises:
  contacting the devices;
  obtaining agreement to participate in the coalition from at least one of the contacted devices; and
  informing each of the devices having agreed to participate of the time and location of the coalition and how to co-locate each device relative to the other participating devices.

10. The non-transitory computer readable storage medium according to claim 9, the recommending further comprising:
  grouping the devices into sets that can receive information streams together;
  informing the devices of a time and location for the coalition; and
  requesting agreement to participate from each of the devices in response to the invitation to participate.

11. The non-transitory computer readable storage medium according to claim 9, further comprising analyzing a service requested in accordance with whether the service can be delivered in entirety to the coalition, said analyzing comprising one or more of analyzing networks in range of the master device and the participating devices, analyzing available bandwidth of the master device and the participating devices, analyzing processing, display, and networking capabilities of the devices, analyzing availability of potential coalition device participants, and analyzing metadata to determine how coalition devices should be physically co-located with each other.

12. The non-transitory computer readable storage medium according to claim 9, wherein the devices register their location, availability and capabilities with the server in a canonical syntax.

* * * * *

UNITED STATES PATENT AND TRADEMARK OFFICE
CERTIFICATE OF CORRECTION

PATENT NO.        : 8,849,900 B2                                    Page 1 of 1
APPLICATION NO.   : 13/040296
DATED             : September 30, 2014
INVENTOR(S)       : Falchuk et al.

It is certified that error appears in the above-identified patent and that said Letters Patent is hereby corrected as shown below:

In the Drawings

In Fig. 9, Sheet 9 of 11, for Tag "S2", in Line 1, delete "Server:" and insert -- Server --, therefor.

In the Specification

In Column 6, Line 35, delete "the" and insert -- (the --, therefor.

Signed and Sealed this
Twelfth Day of May, 2015

Michelle K. Lee
*Director of the United States Patent and Trademark Office*